US012793600B2

(12) United States Patent
Liu et al.

(10) Patent No.: US 12,793,600 B2
(45) Date of Patent: Nov. 10, 2026

(54) GOA CIRCUIT AND DISPLAY PANEL

(71) Applicant: TCL China Star Optoelectronics Technology Co., Ltd., Shenzhen (CN)

(72) Inventors: Yi Liu, Shenzhen (CN); Ying Zhou, Shenzhen (CN)

(73) Assignee: TCL China Star Optoelrectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/793,402

(22) PCT Filed: May 31, 2022

(86) PCT No.: PCT/CN2022/096276
§ 371 (c)(1),
(2) Date: Dec. 2, 2024

(87) PCT Pub. No.: WO2023/226066
PCT Pub. Date: Nov. 30, 2023

(65) Prior Publication Data

US 2025/0329284 A1 Oct. 23, 2025

(30) Foreign Application Priority Data

May 25, 2022 (CN) ......................... 202210577291.5

(51) Int. Cl.
*G09G 3/20* (2006.01)
*G09G 3/36* (2006.01)

(52) U.S. Cl.
CPC ............. *G09G 3/2092* (2013.01); *G09G 3/20* (2013.01); *G09G 3/3677* (2013.01); *G09G 2310/0267* (2013.01); *G09G 2380/02* (2013.01)

(58) Field of Classification Search
CPC ......... G09G 3/2092; G09G 2310/0267; G09G 2380/02; G09G 3/20; G09G 3/3677
See application file for complete search history.

(56) References Cited

U.S. PATENT DOCUMENTS

2007/0104307 A1* 5/2007 Kim ....................... G11C 19/28 377/64
2013/0135284 A1* 5/2013 Tseng ..................... G11C 19/28 345/212
2017/0116924 A1* 4/2017 Zhang .................. G11C 19/287

FOREIGN PATENT DOCUMENTS

| | | |
|---|---|---|
| CN | 105788555 A | 7/2016 |
| CN | 108122529 A | 6/2018 |
| CN | 108962175 A | 12/2018 |
| CN | 110148382 A | 8/2019 |
| CN | 110322854 A | 10/2019 |
| CN | 111986623 A | 11/2020 |

(Continued)

OTHER PUBLICATIONS

International Search Report in International application No. PCT/CN2022/096276, mailed on Dec. 29, 2022.

(Continued)

*Primary Examiner* — Adam J Snyder
(74) *Attorney, Agent, or Firm* — Nathan & Associates Patent Agents Ltd.; Menachem Nathan

(57) ABSTRACT

The disclosure provides a GOA circuit and a display panel. A signal is transmitted to a previous stage and a next stage by a first GOA unit of each stage GOA module, thereby reducing the number of thin film transistors used, simplifying a structure of the GOA circuit, and more benefiting for a narrow frame design of the display panel.

18 Claims, 7 Drawing Sheets

(56) References Cited

FOREIGN PATENT DOCUMENTS

| | | |
|---|---|---|
| KR | 20150002030 A | 1/2015 |
| KR | 20180066375 A | 6/2018 |

OTHER PUBLICATIONS

Written Opinion of the International Search Authority in International application No. PCT/CN2022/096276, mailed on Dec. 29, 2022.

* cited by examiner

GOA CIRCUIT AND DISPLAY PANEL

TECHNICAL FIELD

The present disclosure relates to a display technology field, and in particular, to a GOA (Gate On Array) circuit and a display panel.

BACKGROUND

A GOA circuit can reduce a frame of a display panel. A current GOA circuit includes multi-stage cascaded GOA units. A structure view and timing diagram of each stage GOA unit are shown in FIGS. 1 and 2, respectively. An operation principle of each stage GOA unit is as follows: ST(n−4) and G(n−4) are both at a high potential, T110 is turned on, Q(n) is charged, and T210 and T220 are turned on. At this time, the periodic square wave of CK is synchronously output to ST(n) and G(n), where G(n) is a gate output signal (scan drive signal) input to the scan line inside the panel and configured to turn on TFTs in pixels in each row, and ST(n) can be used as a good stage transfer signal because it is not charged. Then, when G(n+4) is at a high potential, it is used as a pull-down signal to turn on T410 and T310. Q(n) and G(n) are pulled down, T210 and T220 are turned off, and an inverter INV outputs a high level, T420, T710, and T320 are turned on, and Q(n), ST(n) and G(n) are maintained at a low level.

SUMMARY

Technical Problems

Although the above-described GOA circuit may already serve to reduce the display panel frame, since more TFTs are still used, a part of the repeating components of respective stage GOA units may be omitted and combined, to achieve the purpose of a smaller number of TFTs at every stage, thereby further reducing the frame of the display panel.

TECHNICAL SOLUTIONS FOR PROBLEM

Technical Solutions

In order to solve the above problems, an embodiment of the present disclosure provides a GOA circuit including multi-stage cascaded GOA modules, wherein each stage GOA module of the GOA modules includes a first GOA unit, a pull-up unit, a pull-down unit and a plurality of second GOA units, the first GOA unit includes an input terminal, a pull-down terminal and an output terminal, and the second GOA unit includes an input terminal and an output terminal, and wherein

- the input terminal of the first GOA unit of an n-th stage GOA module is connected to the output terminal of the first GOA unit of an (n−1)-th stage GOA module, so that the output terminal of the first GOA unit of the (n−1)-th stage GOA module is configured to pull up the input terminals of the plurality of second GOA units of the n-th stage GOA module through an input terminal of the pull-up unit of the n-th stage GOA module, so that the output terminals of the plurality of second GOA units of the n-th stage GOA module sequentially output a plurality of scan drive signals;
- the output terminal of the first GOA unit of the n-th stage GOA module is connected to the input terminal of the first GOA unit of an (n+1)-th stage GOA module and the pull-down terminal of the first GOA unit of the (n−1)-th stage GOA module; and
- the pull-down terminal of the first GOA unit of the n-th stage GOA module is connected to the output terminal of the first GOA unit of the (n+1)-th stage GOA module, so that the output terminal of the first GOA unit of the (n+1)-th stage GOA module is configured to pull down the input terminals and the output terminals of the plurality of second GOA units of the n-th stage GOA module through the pull-down unit of the n-th stage GOA module.

In some embodiments, the first GOA unit further includes a first clock signal terminal, and the first GOA units of the multi-stage cascaded GOA modules sequentially output signals according to a first clock signal input from the first clock signal terminal.

In some embodiments, the second GOA unit further includes a second clock signal terminal, and the plurality of second GOA units of each stage GOA module sequentially output the plurality of scan drive signals according to a second clock signal input from the second clock signal terminal.

In some embodiments, the first GOA unit of the n-th stage GOA module includes a thirteenth transistor, a twenty-second transistor, a thirty-first transistor, and a forty-third transistor, wherein

- both a gate and a source of the thirteenth transistor are connected to the input terminal of the first GOA unit of the n-th stage GOA module, and a drain of the thirteenth transistor is connected to the input terminal of the first GOA unit of the n-th stage GOA module;
- a gate of the twenty-second transistor is connected to a first pull-up node, a source of the twenty-second transistor is connected to the first clock signal terminal, and a drain of the twenty-second transistor is connected to the output terminal of the first GOA unit of the n-th stage GOA module;
- a gate of the thirty-first transistor and a gate of the forty-third transistor are connected to the pull-down terminal of the first GOA unit of the n-th stage GOA module, a source of the thirty-first transistor and a source of the forty-third transistor are connected to a constant voltage low potential, a drain of the thirty-first transistor is connected to the output terminal of the first GOA unit of the n-th stage GOA module, and a drain of the forty-third transistor is connected to the first pull-up node.

In some embodiments, any second GOA unit of the second GOA units of the n-th stage GOA module includes a twenty-first transistor, a thirty-second transistor, a forty-second transistor, and an inverter, wherein

- a gate of the twenty-first transistor is connected to a pull-up terminal of the second GOA unit of the n-th stage GOA module, a drain of the forty-second transistor, and an input terminal of the inverter, a source of the twenty-first transistor is connected to the second clock signal terminal, and a drain of the twenty-first transistor is connected to the output terminal of the any second GOA unit of the n-th stage GOA module; and
- a gate of the thirty-second transistor and a gate of the forty-second transistor are connected to an output terminal of the inverter, a source of the thirty-second transistor and a source of the forty-second transistor are connected to a constant voltage low potential, a drain of the thirty-second transistor is connected to the output terminal of the any second GOA unit of the n-th GOA module, and a drain of the forty-second transistor is connected to the pull-up terminal of the second GOA unit of the n-th GOA module.

In some embodiments, the inverter includes a fifty-first transistor, a fifty-second transistor, a fifty-third transistor, and a fifty-fourth transistor, wherein a gate and a source of the fifty-first transistor are connected to a constant voltage high potential terminal, and a drain of the fifty-first transistor, a drain of the fifty-second transistor and a gate of the fifty-third transistor are connected;

a gate of the fifty-second transistor and a gate of the fifty-fourth transistor are connected to the pull-up terminal CQ(n) of the second GOA unit, and a source of the fifty-second transistor and a source of the fifty-fourth transistor are connected to the constant voltage low potential; and a source of the fifty-third transistor is connected to the pull-up terminal CQ(n) of the second GOA unit, and a drain of the fifty-third transistor and a drain of the fifty-fourth transistor are connected with each other and connected to the output terminal of the inverter.

In some embodiments, the pull-up unit of the n-th stage GOA module includes an eleventh transistor, a gate and a drain of the eleventh transistor is connected to the first pull-up node, and a drain of the eleventh transistor is connected to pull-up terminals of the plurality of second GOA units of the n-th stage GOA module.

In some embodiments, the pull-down unit of the n-th GOA module includes a forty-first transistor, a gate of the forty-first transistor is connected to the pull-down terminal of the first GOA unit of the n-th GOA module, a source of the forty-first transistor is connected to a constant voltage low potential, and a drain of the forty-first transistor is connected to pull-up terminals of the plurality of second GOA units of the n-th GOA module.

In some embodiments, eight clock cycle signals are used at the first clock signal terminal, with any two successive clock cycle signals separated by half a clock cycle.

In another aspect, an embodiment of the present disclosure further provides a display panel including a GOA circuit as described above, wherein the GOA circuit includes multi-stage cascaded GOA modules, each stage GOA module of the GOA modules includes a first GOA unit, a pull-up unit, a pull-down unit and a plurality of second GOA units, the first GOA unit includes an input terminal, a pull-down terminal and an output terminal, and the second GOA unit includes an input terminal and an output terminal, and wherein the input terminal of the first GOA unit of an n-th stage GOA module is connected to the output terminal of the first GOA unit of an (n−1)-th stage GOA module, so that the output terminal of the first GOA unit of the (n−1)-th stage GOA module is configured to pull up the input terminals of the plurality of second GOA units of the n-th stage GOA module through an input terminal of the pull-up unit of the n-th stage GOA module, so that the output terminals of the plurality of second GOA units of the n-th stage GOA module sequentially output a plurality of scan drive signals;

the output terminal of the first GOA unit of the n-th stage GOA module is connected to the input terminal of the first GOA unit of an (n+1)-th stage GOA module and the pull-down terminal of the first GOA unit of the (n−1)-th stage GOA module;

the pull-down terminal of the first GOA unit of the n-th stage GOA module is connected to the output terminal of the first GOA unit of the (n+1)-th stage GOA module, so that the output terminal of the first GOA unit of the (n+1)-th stage GOA module is configured to pull down the input terminals and the output terminals of the plurality of second GOA units of the n-th stage GOA module through the pull-down unit of the n-th stage GOA module.

In some embodiments, the first GOA unit further includes a first clock signal terminal, and the first GOA units of the multi-stage cascaded GOA modules sequentially output signals according to a first clock signal input from the first clock signal terminal.

In some embodiments, the second GOA unit further includes a second clock signal terminal, and the plurality of second GOA units of each stage GOA module sequentially output a plurality of scan drive signals according to a second clock signal input from the second clock signal terminal.

In some embodiments, the second GOA unit further includes a second clock signal terminal, and the plurality of second GOA units of each stage GOA module sequentially output a plurality of scan drive signals according to a second clock signal input from the second clock signal terminal.

In some embodiments, the first GOA unit of the n-th stage GOA module includes a thirteenth transistor, a twenty-second transistor, a thirty-first transistor, and a forty-third transistor, wherein both a gate and a source of the thirteenth transistor are connected to the input terminal of the first GOA unit of the n-th stage GOA module, and a drain of the thirteenth transistor is connected to a first pull-up node;

a gate of the twenty-second transistor is connected to the first pull-up node, a source of the twenty-second transistor is connected to the first clock signal terminal, and a drain of the twenty-second transistor is connected to the output terminal of the first GOA unit of the n-th stage GOA module;

a gate of the thirty-first transistor and a gate of the forty-third transistor are connected to the pull-down terminal of the first GOA unit of the n-th stage GOA module, a source of the thirty-first transistor and a source of the forty-third transistor are connected to a constant voltage low potential, a drain of the thirty-first transistor is connected to the output terminal of the first GOA unit of the n-th stage GOA module, and a drain of the forty-third transistor is connected to the first pull-up node.

In some embodiments, any second GOA unit of the second GOA units of the n-th stage GOA module includes a twenty-first transistor, a thirty-second transistor, a forty-second transistor, and an inverter, wherein a gate of the twenty-first transistor is connected to a pull-up terminal of the second GOA unit of the n-th stage GOA module, a drain of the forty-second transistor, and an input terminal of the inverter, a source of the twenty-first transistor is connected to the second clock signal terminal, and a drain of the twenty-first transistor is connected to the output terminal of the any second GOA unit of the n-th stage GOA module;

a gate of the thirty-second transistor and a gate of the forty-second transistor are connected to an output terminal of the inverter, a source of the thirty-second transistor and a source of the forty-second transistor are connected to a constant voltage low potential, a drain of the thirty-second transistor is connected to the output terminal of the any second GOA unit of the n-th GOA module, and a drain of the forty-second transistor is connected to the pull-up terminal of the second GOA unit of the n-th GOA module.

In some embodiments, the inverter includes a fifty-first transistor, a fifty-second transistor, a fifty-third transistor, and a fifty-fourth transistor, wherein

- a gate and a source of the fifty-first transistor are connected to a low frequency control signal, and a drain of the fifty-first transistor, a drain of the fifty-second transistor, and a gate of the fifty-third transistor are connected;
- a gate of the fifty-second transistor and a gate of the fifty-fourth transistor are connected to the pull-up terminal CQ(n) of the second GOA unit, and a source of the fifty-second transistor and a source of the fifty-fourth transistor are connected to the constant voltage low potential;
- a source of the fifty-third transistor is connected to the pull-up terminal CQ(n) of the second GOA unit, and a drain of the fifty-third transistor and a drain of the fifty-fourth transistor are connected with each other and connected to the output terminal of the inverter.

In some embodiments, the pull-up unit of the n-th stage GOA module includes an eleventh transistor, a gate and a drain of the eleventh transistor is connected to the input terminal of the first GOA unit of the n-th stage GOA module, and a drain of the eleventh transistor is connected to pull-up terminals of the plurality of second GOA units of the n-th stage GOA module.

In some embodiments, the pull-down unit of the n-th GOA module includes a forty-first transistor, a gate of the forty-first transistor is connected to the pull-down terminal of the first GOA unit of the n-th GOA module, a source of the forty-first transistor is connected to a constant voltage low potential, and a drain of the forty-first transistor is connected to pull-up terminals of the plurality of second GOA units of the n-th GOA module.

In some embodiments, eight clock cycle signals are used at the first clock signal terminal, with any two successive clock cycle signals separated by half a clock cycle.

BENEFICIAL EFFECTS OF THE INVENTION

Beneficial Effects

According to a GOA circuit and a display panel provided in an embodiment of the present disclosure, an input end of a first GOA unit and input ends of a plurality of second GOA units of a next stage GOA module are pulled up by an output end of a first GOA unit of each stage GOA module, so that the plurality of second GOA units of the next stage GOA module are all turned on and sequentially output the plurality of scan drive signals. At the same time, a pull-down terminal of a first GOA unit of a previous stage GOA module is further pulled down by the first GOA unit of each stage GOA module, so that a plurality of GOA units of the previous stage GOA module are all turned off. Thus, the signal is transmitted to a previous stage and a next stage by a first GOA unit of each stage GOA module, thereby reducing the number of thin film transistors used, simplifying a structure of the GOA circuit, and more benefiting for a narrow frame design of the display panel.

ILLUSTRATION OF THE DRAWINGS

IMPLEMENTATIONS OF THE INVENTION

DETAILED DESCRIPTION OF EMBODIMENTS

In order to make an object, a technical solution and an effect of the present disclosure clearer and more explicit, the following further describes the present disclosure in detail with reference to the accompanying drawings and illustrations. It should be understood that the specific embodiments described herein are merely intended to explain the present disclosure and are not intended to limit the present disclosure.

Figure 3:
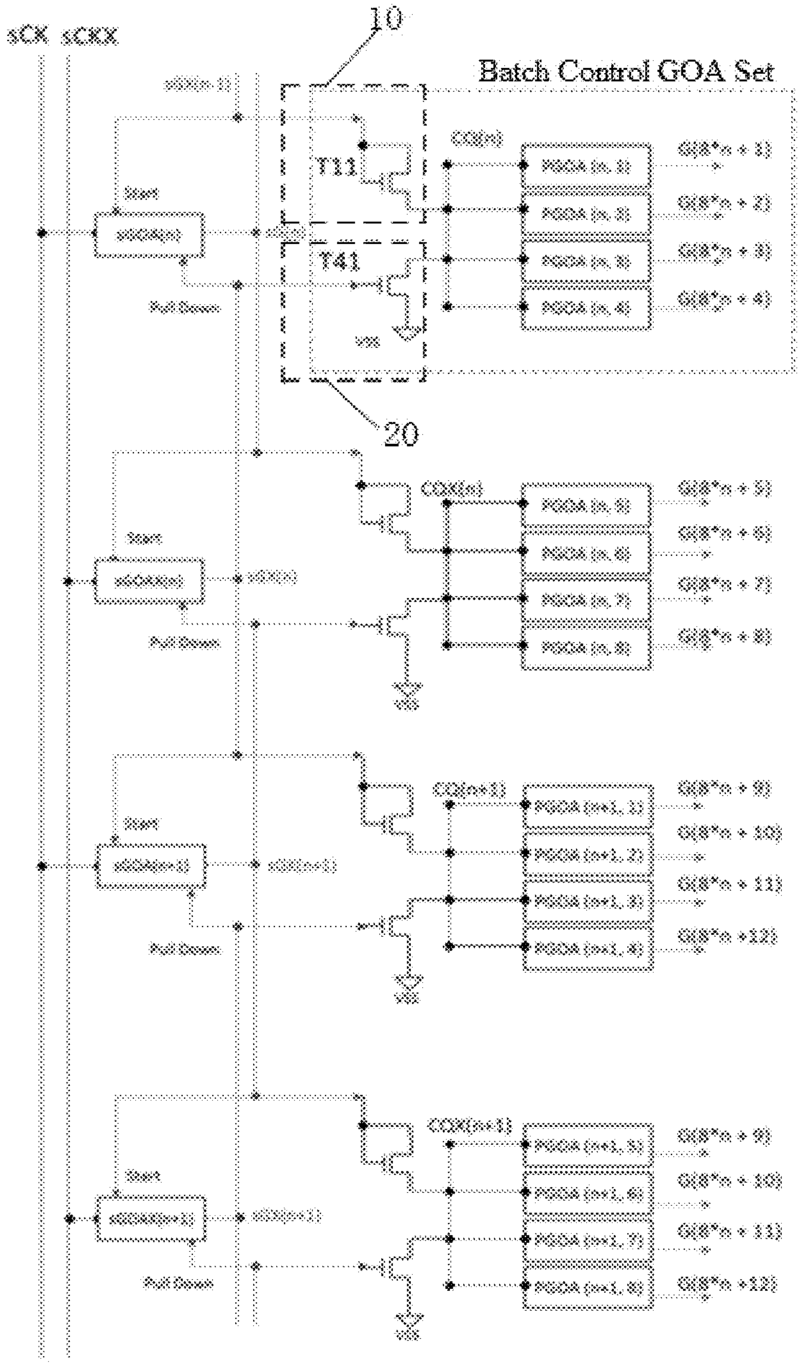
FIG. 3 is a structural schematic view of a GOA circuit according to an embodiment of the present disclosure.

As shown in FIG. 3, an embodiment of the present disclosure provides a GOA circuit including a multi-stage cascaded GOA module. Each stage GOA module includes a first GOA unit (sGOA), a pull-up unit (10), a pull-down unit (20) and a plurality of second GOA units (pGOAs). The first GOA unit (sGOA) includes an input terminal (Start), a pull-down terminal (pull down) and an output terminal sG(n). The second GOA unit (pGOA) includes an input terminal CQ(n) and an output terminal G(n), wherein, The input terminal (Start) of the first GOA unit of an n-th stage GOA module is connected to the output terminal sG(n−1) of the first GOA unit of an (n−1)-th stage GOA module, so that the output terminal sG(n−1) of the first GOA unit of the (n−1)-th stage GOA module is configured to pull up the input terminals CQ(n)s of the plurality of second GOA units of the n-th stage GOA module through the input terminal (Start) of the pull-up unit 10 of the n-th stage GOA module, and further, so that a plurality of scan drive signals is sequentially output from the output terminals G(n)s of the plurality of second GOA units of the n-th stage GOA module;

The output terminal sG(n) of the first GOA unit of the n-th stage GOA module is connected to the input terminal (Start) of the first GOA unit of an (n+1)-th stage GOA module and the pull-down terminal (pull down) of the first GOA unit of the (n−1)-th stage GOA module;

The pull-down terminal (pull down) of the first GOA unit of the n-th stage GOA module is connected to the output terminal sG(n−1) of the first GOA unit of the (n+1)-th stage GOA module, so that the output terminal sG(n+1) of the first GOA unit of the (n+1)-th stage GOA module is configured to pull down the input terminals CQ(n)s and the output terminals G(n)s of the plurality of second GOA units of the n-th stage GOA module through the pull-down unit 20 of the n-th stage GOA module.

According to the GOA circuit provided in an embodiment of the present disclosure, the input end of the first GOA unit and the input ends of the plurality of second GOA units of the next stage GOA module are pulled up by the output end of the first GOA unit of each stage GOA module, so that the plurality of second GOA units of the next stage GOA module are all turned on and sequentially output the plurality of scan drive signals. At the same time, the pull-down terminal of the first GOA unit of the previous stage GOA module is also pulled down by the first GOA unit of each stage GOA module, so that the plurality of GOA units of the previous stage GOA module are all turned off. Thus, the signal is transmitted to a previous stage and a next stage by one first GOA unit.

That is, in the GOA circuit provided in the embodiment of the present disclosure, the first GOA units of respective stage GOA modules are cascaded, and the first GOA unit itself does not output a scan signal, but only outputs a pull-down signal to the previous stage GOA module, and outputs a pull-up signal to the next stage GOA module. In this way, the pull-down unit 20 of the previous stage GOA module makes the plurality of scan drive signals sequentially output from the plurality of second GOA units of the previous stage GOA module off, and the pull-up unit 10 of the next stage of the GOA module makes the plurality of scanning driving signals output from the plurality of GOA units of the next stage of the GOA module on. As such, each stage GOA module sequentially outputs a plurality of scan drive signals by the plurality of second GOA units by using the common first GOA unit, the common pull-up unit, and the common pull-down unit, thereby reducing the number of thin film transistors, simplifying the structure of the GOA circuit, and more benefiting for the narrow frame design of the display panel.

Note that the input terminal (start) of the pull-up unit 10 of the first stage GOA module is connected to an initial pull-up signal (sSTV).

Figure 4:
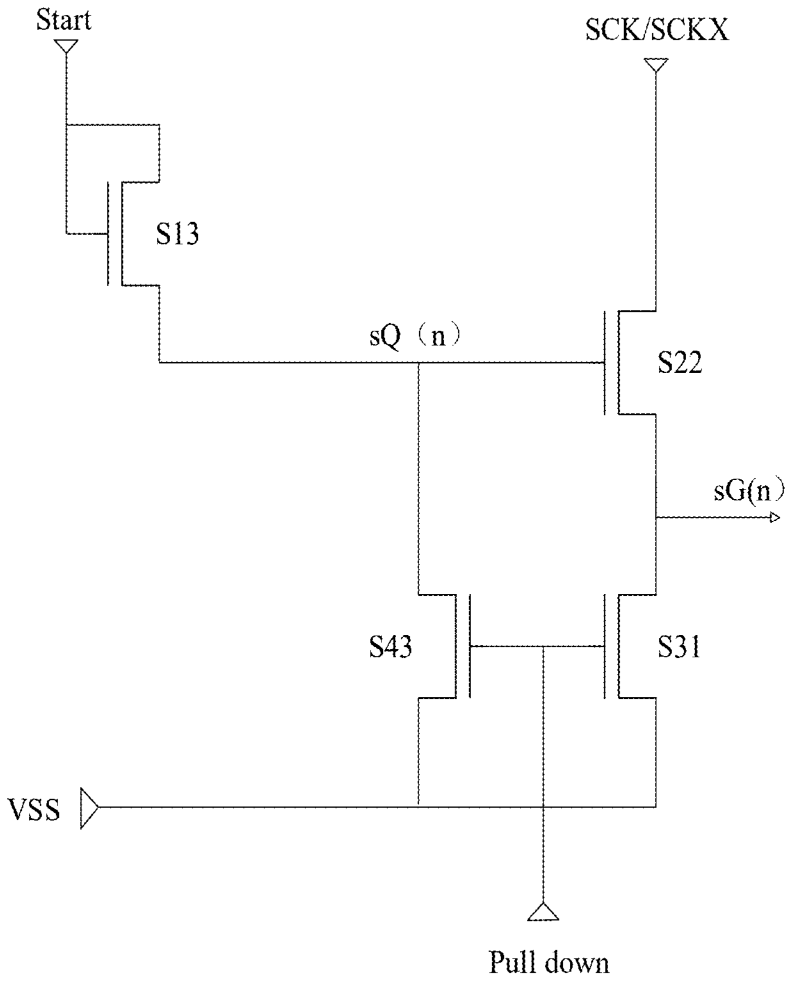
FIG. 4 is a structural schematic view of a first GOA unit of a GOA circuit according to an embodiment of the present disclosure.
Figure 7:
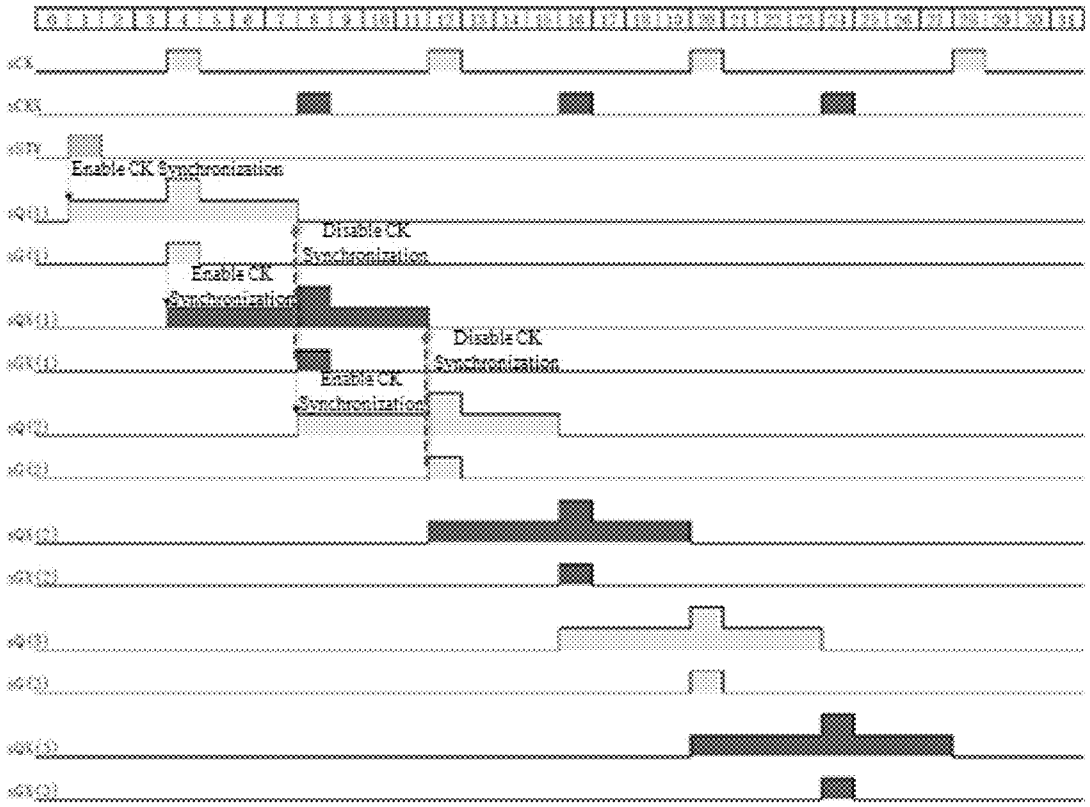
FIG. 7 is a timing diagram of a first GOA unit of a GOA circuit according to an embodiment of the present disclosure.

In conjunction with FIGS. 4 and 7, the first GOA unit (sGOA) further includes a first clock signal terminal (sCK/sCKX). The first GOA units (sGOAs) of the multi-stage cascaded GOA modules sequentially output signals sG(n)s according to a first clock signal input from the first clock signal terminal (sCK/sCKX). That is, the first GOA units of the successive GOA modules may be disposed with two clock signals sCK and sCKX of the same cycle and width, the width of the high potential is 1 H, the total cycle is 8H, and thus the duty cycle is 12.5%.

Figure 5:
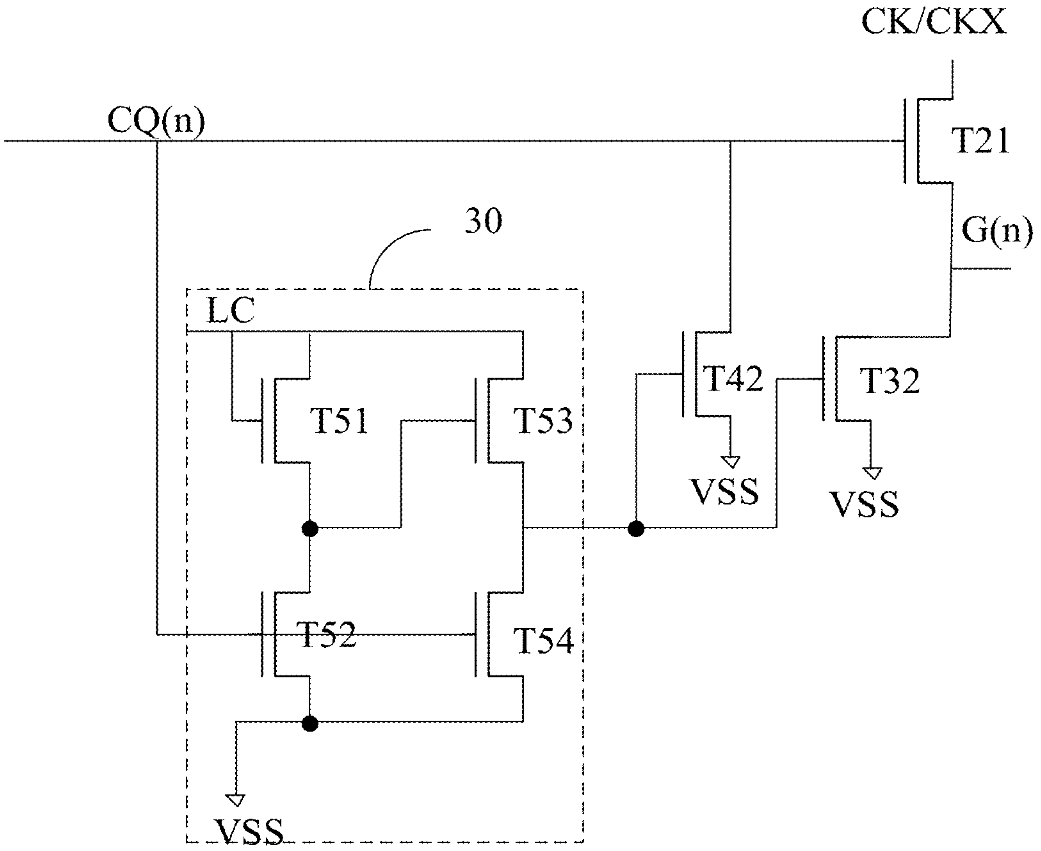
FIG. 5 is a structural schematic view of a second GOA unit of a GOA circuit according to an embodiment of the present disclosure.

As shown in FIG. 5, the second GOA unit (pGOA) further includes a second clock signal terminal (CK/CKX). The plurality of second GOA (pGOA) units of each stage GOA module sequentially output the plurality of scan drive signals according to a second clock signal input from the second clock signal terminal (CK/CKX).

In conjunction with FIGS. 3 and 4, the first GOA unit (sGOA) of the n-th stage GOA module includes a thirteenth transistor S13, a twenty-second transistor S22, a thirty-first transistor S31, and a forty-third transistor S43, wherein, both a gate and a source of the thirteenth transistor S13 are connected to the input terminal (Start) of the first GOA unit of the n-th stage GOA module, and a drain of the thirteenth transistor S13 is connected to a first pull-up node sQ(n);

a gate of the twenty-second transistor S22 is connected to the first pull-up node sQ(n), a source of the twenty-second transistor S22 is connected to the first clock signal terminal sCK/sCKX, and a drain of the twenty-second transistor S22 is connected to the output terminal sG(n) of the first GOA unit of the n-th stage GOA module; and a gate of the thirty-first transistor S31 and a gate of the forty-third transistor S43 are connected to the pull-down terminal (pull down) of the first GOA unit of the n-th stage GOA module, a source of the thirty-first transistor S31 and a source of the forty-third transistor S43 are connected to a constant voltage low potential VSS, a drain of the thirty-first transistor S31 is connected to the output terminal sG(n) of the first GOA unit of the n-th stage GOA module, and a drain of the forty-first transistor is connected to the first pull-up node.

Specifically, at a rising edge time of the sSTV signal, the sQ(1) is raised by the sSTV. Due to the one-directional conduction function of the thirty-first transistor S13, when the sSTV falls, the sQ(1) remains in the high potential state. The gate of the twenty-second transistor S22 is turned on when the sQ(1) is in the high potential state, and the sG(1) is synchronized with the signal of the sCK.

As shown in FIG. 3, the sG(1) signal is the start signal of the sGX(1). After the sG(1) is synchronized with a high potential of the sCK, the sQ(1) is kept at the high potential after the rising edge of the sG(1). At this time, the sGX(1) is synchronized with the signal of the sGX(1), and the sGX(1) and the signal of the sGX(1) are kept the same. When sGX(1) is synchronized with the high level signal of sCKX, sGX (1) returns to the gates of S31 and S43 of sGOA(1). At this time, when sQ(1) is pulled down, sG(1) is not synchronized with sCK. The stage transfer relationship between the first GOA units (sGOAs) of the subsequent GOA modules, for example, the stage transfer relationship between sGOA(2) and sGOAX(1), is similar to this, and is not described herein again.

Figure 6:
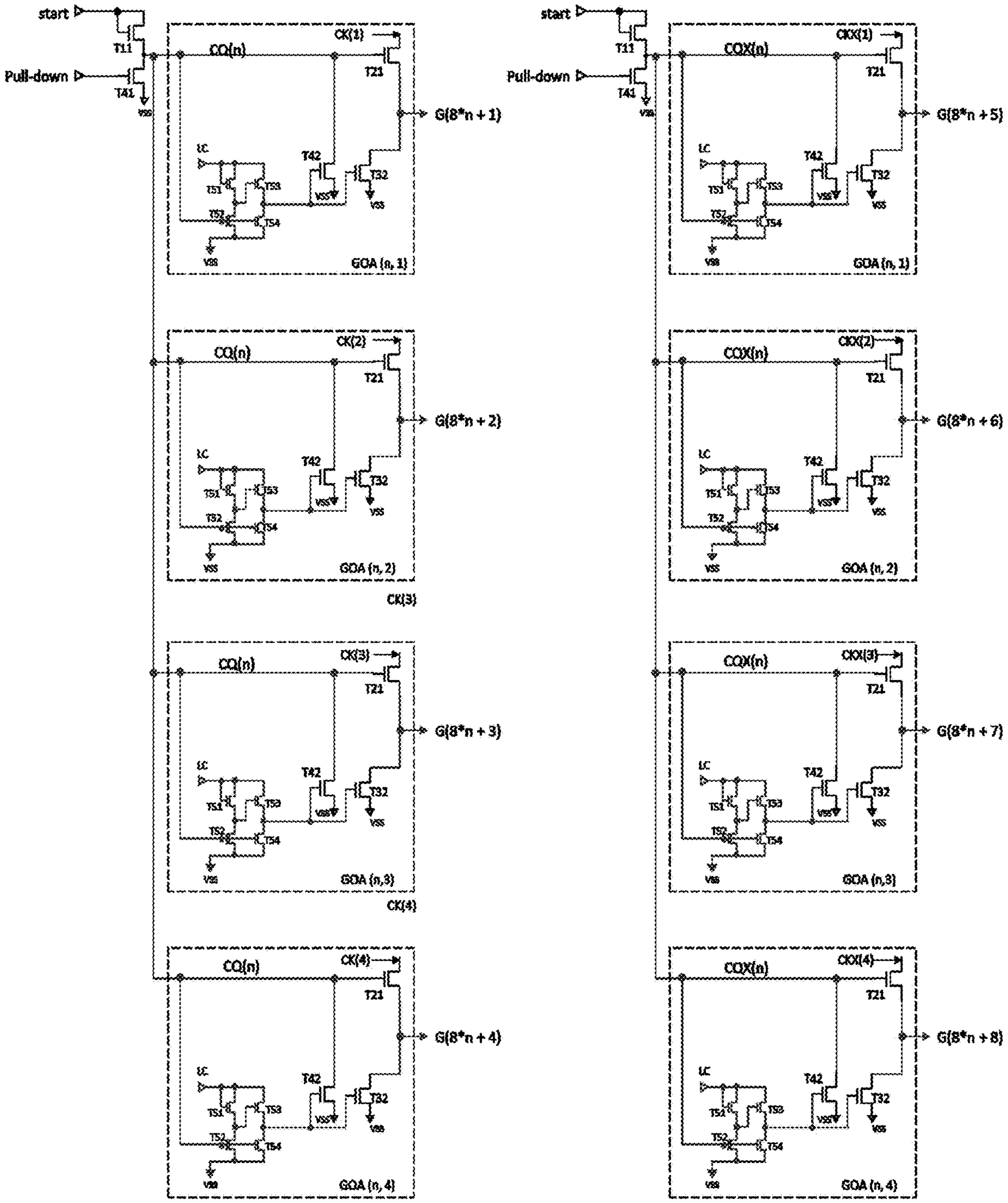
FIG. 6 is a structural schematic view of eight-stage second GOA units in an 8CK cycle of a GOA circuit according to an embodiment of the present disclosure.

In conjunction with FIGS. 3, 5 and 6, any second GOA unit (pGOA) of the n-th stage GOA module (taking eight cascaded pGOAs as an example in FIG. 6) includes a twenty-first transistor T21, a thirty-second transistor T32, a forty-second transistor T42, and an inverter 30, wherein, a gate of the twenty-first transistor T21 is connected to the pull-up terminal CQ(n) of the second GOA unit of the n-th stage GOA module, a drain of the forty-second transistor T42, and an input terminal of the inverter 30, and a source of the twenty-first transistor T21 is connected to the second clock signal terminal CK/CKX, and a drain of the twenty-first transistor T21 is connected to the output terminal G(n) of any second GOA unit of the n-th stage GOA module; and a gate of the thirty-second transistor T32 and a gate of the forty-second transistor T42 are connected to the output terminal of the inverter 30, a source of the thirty-second transistor T32 and a source of the forty-second transistor T42 are connected to the constant voltage low potential VSS, a drain of the thirty-second transistor T32 is connected to the output terminal G(n) of any second GOA unit of the n-th GOA module, and a drain of the forty-second transistor T42 is connected to the pull-up terminal CQ(n) of the second GOA unit of the n-th GOA module.

Specifically, according to the sGOA, single H timing control signals sG(1), sGX(1), sG(2), sGX(2), and the like sequential delayed may be independently generated. In the connection relationship shown in FIG. 3, a high potential signal of CQ(1) is activated by a high potential signal of sG(1), and a low potential recovery is performed on the signal of CQ(1) by a pulse of sG(2). During the high-potential period of CQ(1), G(1)-G(4) are synchronized with the signals from CK(1) to CK(4), respectively, and the synchronizations between G(1)-G(4) and CKs are disabled by the CQ(1) signal. In timing diagram, sG (1) and sG (2) always rise to the high potential at a time before the rising edge of CK with one H therebetween, so that the high potential of CQ(1) precisely crosses the high potential periods of CK1~CK4, and thus PGOA(1)-PGOA(4) may be respectively synchronized with a complete high potential square waveform of CK. For the other PGOA, the same timing logic is suitable for the synchronous turn-on and turn-off processes of the other PGOA. For example, the synchronization period corresponding to sCK(1) and sCK(2) is a period between the two rising edges of these two square wave signals, during which XQ(1) is a high potential signal, so that PGOA(5)~PGOA (8) may be synchronized with the waveform of CKX(1)~CKX(4) in this period, and thus output the Gate waveform of G(5)~G(8).

Further, the inverter 30 includes a fifty-first transistor T51, a fifty-second transistor T52, a fifty-third transistor T53, and a fifty-fourth transistor T54, wherein, a gate and a source of the fifty-first transistor T51 are connected to the low frequency control signal LC, a drain of the fifty-first transistor T51, a drain of the fifty-second transistor T51 and a gate of the fifty-third transistor T53 are connected;

a gate of the fifty-second transistor T52 and a gate of the fifty-fourth transistor T54 are connected to a pull-up terminal CQ(n) of the second GOA unit, and a source of the fifty-second transistor T52 and a source of the fifty-fourth transistor T54 are connected to the constant voltage low potential; and a source of the fifty-third transistor T53 is connected to the pull-up terminal CQ(n) of the second GOA unit, and a drain of the fifty-third transistor T53 and a drain of the fifty-fourth transistor T54 are connected with each other and connected to the output terminal of the inverter 30.

In some embodiments, the pull-up unit 10 of the n-th stage GOA module includes an eleventh transistor T11 having a gate and a drain connected to the input terminal (Start) of the first GOA unit of the n-th stage GOA module, and a drain of the thirteenth crystal T11 connected to the pull-up terminal CQ(n) of the plurality of second GOA units of the n-th stage GOA module.

In some embodiments, the pull-down unit 20 of the n-th stage GOA module includes a forty-first transistor T41, a gate of the forty-first transistor T41 is connected to the pull-down terminal (pull down) of the first GOA unit of the n-th stage GOA module, a source of the forty-first transistor T41 is connected to the constant voltage low potential VSS, and a drain of the forty-first transistor T41 is connected to the pull-up terminal CQ(n) of the plurality of second GOA units of the n-th stage GOA module.

Figure 1:
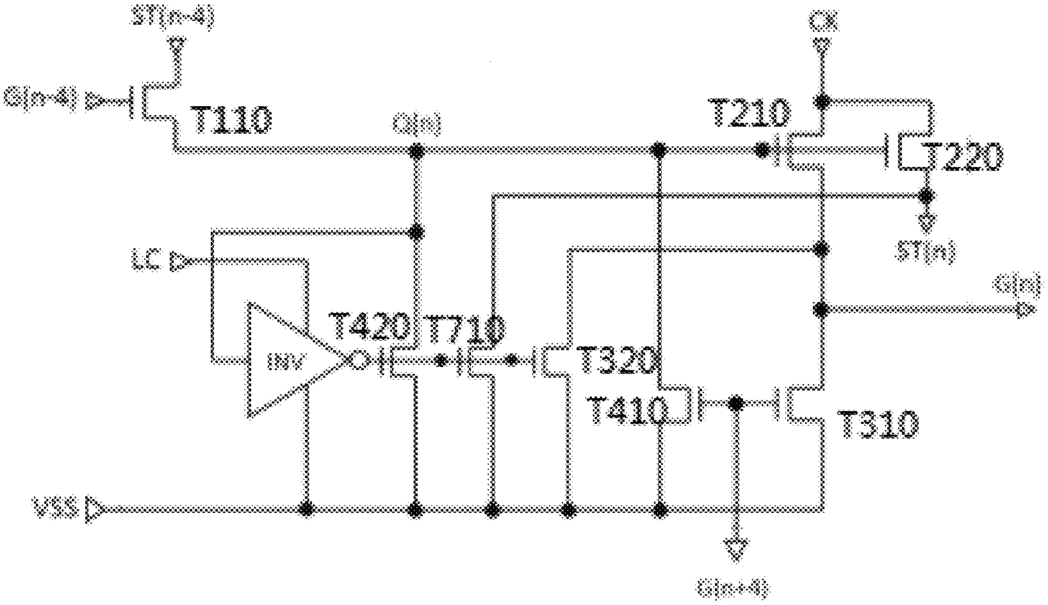
FIG. 1 is a structural schematic view of a current GOA circuit in the related art.
Figure 2:
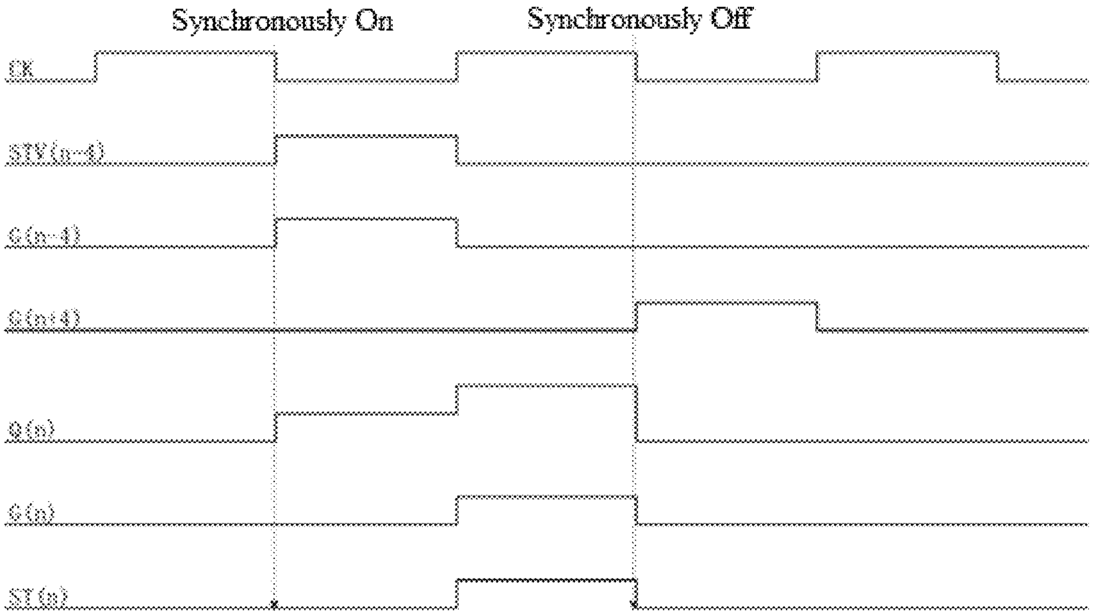
FIG. 2 is a timing diagram of a current GOA circuit in the related art.

It should be noted that, compared with the structure of the current GOA circuit shown in FIG. 1, in the GOA circuit of an embodiment of the present disclosure, the second GOA unit (pGOA) and the eleventh transistor T11 and the forty-first transistor T41 of each stage GOA module omit the T310 in FIG. 1 as a whole. This design is mainly based on that the pull-down of the output signal G(n) of the second GOA unit is driven by the falling edge of the CK. The T31 does not actually play the effect of pulling down the G(n) signal, but is only used to turn on the G(n) and the VSS for a period of time after the pull-down of the G(n). Therefore, it is omitted here, and only the pull-down of the inverter is maintained to further reduce the number of thin film transistors used in the GOA module, thereby simplifying the structure of the GOA circuit.

In some embodiments, eight clock cycle signals are used at the first clock signal terminal (sCK/sCKX), with any two successive clock cycle signals are separated by half a clock cycle.

Figure 8:
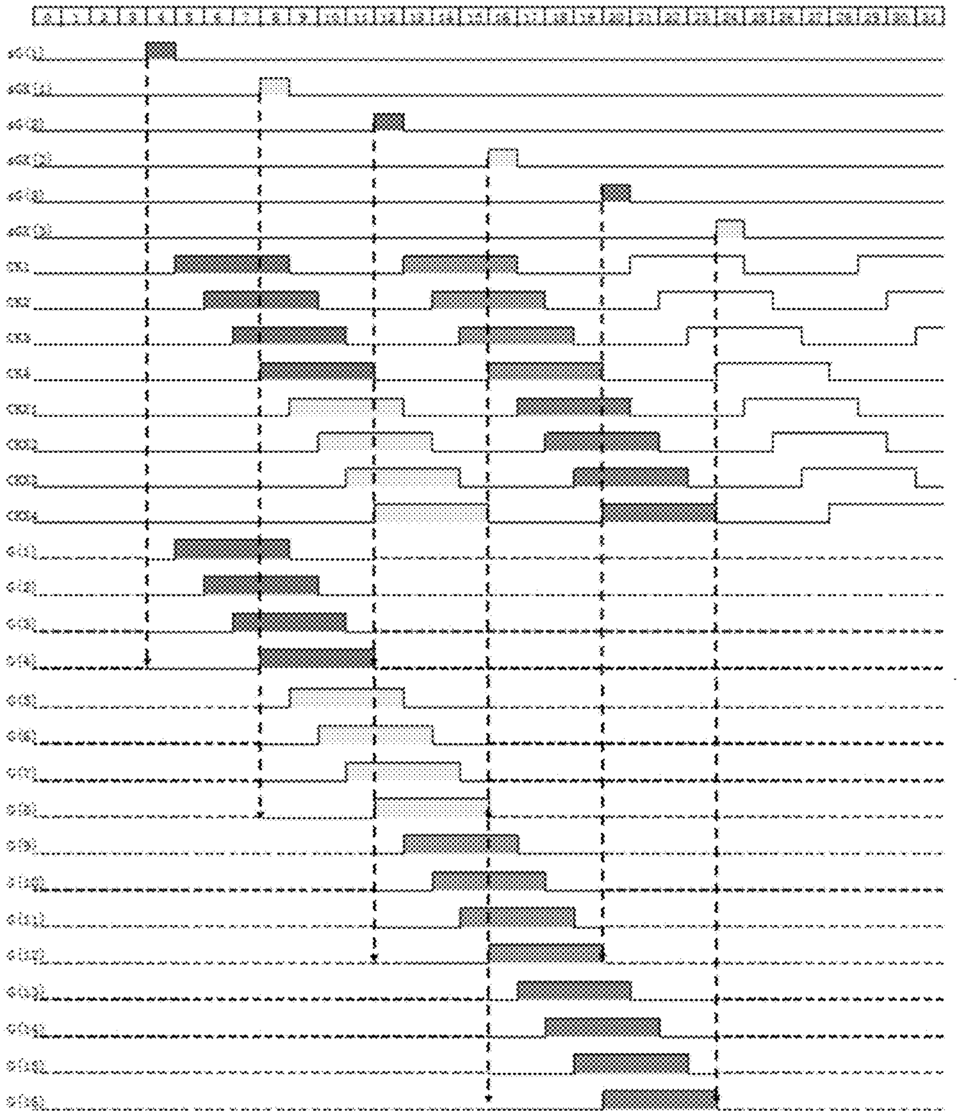
FIG. 8 is a timing diagram of a second GOA unit of a GOA circuit according to an embodiment of the present disclosure.

It should be noted that the above-described embodiment is explained only by taking 8CK as an example. For example, for the driving mode of 2N CK, the cycle of sCK/sCKX is 2N×H, the duty ratio is ½N, and the phases are still different by N×H. In addition, the number of PGOAs sharing one CQ or CQX is N, and the high potential period in the cycle and the period of the whole cycle of CK/XCK are N×H and 2N×H, respectively. It is necessary to ensure that, as shown in FIG. 8, the square wave pulses of sG and sGX are always kept ahead of the rising edges of the corresponding CK and XCK by one H.

Figure 9:
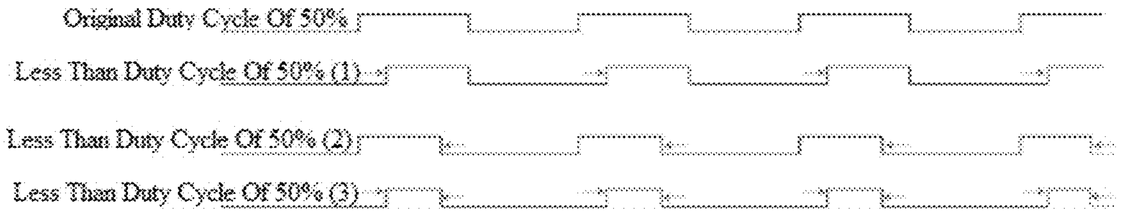
FIG. 9 is a schematic diagram of a reduced second clock signal duty cycle of a GOA circuit according to an embodiment of the present disclosure.

Further, the above is described in a logic timing with CK and XCK as the ½ duty ratio. It should be noted that the premise for the above pGOA to normally output G(n) is that the CQ and CQX signals are pulled down by the forty-second transistor T42 within one H after the rising edge of the pull-down signal received by the forty-second transistor T42. Otherwise, the CQ and CQX signals that have not been fully pulled down will cause the twenty-first transistor T21 to be synchronized with the CQ signal in the next cycle, which causes the output abnormality. Considering the fact that the CQ and CQX fall slowly due to the load is slow in the actual situation, it is possible that the signal cannot be completely pulled down within one H. Therefore, the high potential duty cycle of CK and XCK may be appropriately reduced. That is, the period at the high potential is reduced, to increase the time taken for pulling down the T41. As shown in FIG. 9, the STV signals are no longer generated by the CK and the XCK, so that the reduction of the duty ratio can be either on the rising edge or on the falling edge of the CK and the XCK. That is, all three ways of reducing the duty cycle shown in FIG. 9 are possible.

Based on the above embodiments, an embodiment of the present disclosure further provides a display panel including the GOA circuit as described above. The display panel includes the same structure and advantageous effects as the GOA circuit. Since the GOA circuit has been described in detail in the above embodiments, details are not described herein again.

It is to be understood that the technical solutions of the present disclosure and the inventive concepts thereof may be equally substituted or modified by those of ordinary skill in the art, and all such modification or substitution shall fall within the scope of the claims appended in the present disclosure.

What is claimed is:

1. A GOA circuit comprising multi-stage cascaded GOA modules, wherein each stage GOA module of the GOA modules comprises a first GOA unit, a pull-up unit, a pull-down unit and a plurality of second GOA units, the first GOA unit comprises an input terminal, a pull-down terminal and an output terminal, and the second GOA unit comprises an input terminal and an output terminal, and wherein the input terminal of the first GOA unit of an n-th stage GOA module is connected to the output terminal of the first GOA unit of an (n−1)-th stage GOA module, so that the output terminal of the first GOA unit of the (n−1)-th stage GOA module is configured to pull up the input terminals of the plurality of second GOA units of the n-th stage GOA module through an input terminal of the pull-up unit of the n-th stage GOA module, so that the output terminals of the plurality of second GOA units of the n-th stage GOA module sequentially output a plurality of scan drive signals;

the output terminal of the first GOA unit of the n-th stage GOA module is connected to the input terminal of the first GOA unit of an (n+1)-th stage GOA module and the pull-down terminal of the first GOA unit of the (n−1)-th stage GOA module; and the pull-down terminal of the first GOA unit of the n-th stage GOA module is connected to the output terminal of the first GOA unit of the (n+1)-th stage GOA module, so that the output terminal of the first GOA unit of the (n+1)-th stage GOA module is configured to pull down the input terminals and the output terminals of the plurality of second GOA units of the n-th stage GOA module through the pull-down unit of the n-th stage GOA module.

2. The GOA circuit according to claim 1, wherein the first GOA unit further comprises a first clock signal terminal, and the first GOA units of the multi-stage cascaded GOA modules sequentially output signals according to a first clock signal input from the first clock signal terminal.

3. The GOA circuit according to claim 2, wherein the first GOA unit of the n-th stage GOA module comprises a thirteenth transistor, a twenty-second transistor, a thirty-first transistor, and a forty-third transistor, and wherein a gate and a source of the thirteenth transistor are both connected to the input terminal of the first GOA unit of the n-th stage GOA module, and a drain of the thirteenth transistor is connected to a first pull-up node;

a gate of the twenty-second transistor is connected to the first pull-up node, a source of the twenty-second transistor is connected to the first clock signal terminal, and a drain of the twenty-second transistor is connected to the output terminal of the first GOA unit of the n-th stage GOA module;

a gate of the thirty-first transistor and a gate of the forty-third transistor are connected to the pull-down terminal of the first GOA unit of the n-th stage GOA module, a source of the thirty-first transistor and a source of the forty-third transistor are connected to a constant voltage low potential, a drain of the thirty-first transistor is connected to the output terminal of the first GOA unit of the n-th stage GOA module, and a drain of the forty-third transistor is connected to the first pull-up node.

4. The GOA circuit according to claim 3, wherein the pull-up unit of the n-th stage GOA module comprises an eleventh transistor, a gate and a drain of the eleventh transistor is connected to the input terminal of the first GOA unit of the n-th stage GOA module, and a drain of the eleventh transistor is connected to pull-up terminals of the plurality of second GOA units of the n-th stage GOA module.

5. The GOA circuit according to claim 2, wherein eight clock cycle signals are used at the first clock signal terminal, with any two successive clock cycle signals separated by half a clock cycle.

6. The GOA circuit according to claim 1, wherein the second GOA unit further comprises a second clock signal terminal, and the plurality of second GOA units of each stage GOA module sequentially output the plurality of scan drive signals according to a second clock signal input from the second clock signal terminal.

7. The GOA circuit according to claim 6, wherein any second GOA unit of the second GOA units of the n-th stage GOA module comprises a twenty-first transistor, a thirty-second transistor, a forty-second transistor, and an inverter, and wherein a gate of the twenty-first transistor is connected to a pull-up terminal of the second GOA unit of the n-th stage GOA module, a drain of the forty-second transistor, and an input terminal of the inverter, a source of the twenty-first transistor is connected to the second clock signal terminal, and a drain of the twenty-first transistor is connected to the output terminal of the any second GOA unit of the n-th stage GOA module; and a gate of the thirty-second transistor and a gate of the forty-second transistor are connected to an output terminal of the inverter, a source of the thirty-second transistor and a source of the forty-second transistor are connected to a constant voltage low potential, a drain of the thirty-second transistor is connected to the output terminal of the any second GOA unit of the n-th GOA module, and a drain of the forty-second transistor is connected to the pull-up terminal of the second GOA unit of the n-th GOA module.

8. The GOA circuit according to claim 7, wherein the inverter comprises a fifty-first transistor, a fifty-second transistor, a fifty-third transistor, and a fifty-fourth transistor, and wherein a gate and a source of the fifty-first transistor are connected to a low frequency control signal, and a drain of the fifty-first transistor, a drain of the fifty-second transistor, and a gate of the fifty-third transistor are connected;

a gate of the fifty-second transistor and a gate of the fifty-fourth transistor are connected to the pull-up terminal of the second GOA unit, and a source of the fifty-second transistor and a source of the fifty-fourth transistor are connected to the constant voltage low potential; and a source of the fifty-third transistor is connected to a low frequency control signal, and a drain of the fifty-third transistor and a drain of the fifty-fourth transistor are connected with each other and connected to the output terminal of the inverter.

9. The GOA circuit according to claim 1, wherein the pull-down unit of the n-th GOA module comprises a forty-first transistor, a gate of the forty-first transistor is connected to the pull-down terminal of the first GOA unit of the n-th GOA module, a source of the forty-first transistor is connected to a constant voltage low potential, and a drain of the forty-first transistor is connected to pull-up terminals of the plurality of second GOA units of the n-th GOA module.

10. A display panel comprising a GOA circuit comprising multi-stage cascaded GOA modules, wherein each stage GOA module of the GOA modules comprises a first GOA unit, a pull-up unit, a pull-down unit and a plurality of second GOA units, the first GOA unit comprises an input terminal, a pull-down terminal and an output terminal, and the second GOA unit comprises an input terminal and an output terminal, and wherein the input terminal of the first GOA unit of an n-th stage GOA module is connected to the output terminal of the first GOA unit of an (n−1)-th stage GOA module, so that the output terminal of the first GOA unit of the (n−1)-th stage GOA module is configured to pull up the input terminals of the plurality of second GOA units of the n-th stage GOA module through an input terminal of the pull-up unit of the n-th stage GOA module, so that the output terminals of the plurality of second GOA units of the n-th stage GOA module sequentially output a plurality of scan drive signals;

the output terminal of the first GOA unit of the n-th stage GOA module is connected to the input terminal of the first GOA unit of an (n+1)-th stage GOA module and the pull-down terminal of the first GOA unit of the (n−1)-th stage GOA module; and the pull-down terminal of the first GOA unit of the n-th stage GOA module is connected to the output terminal of the first GOA unit of the (n+1)-th stage GOA module, so that the output terminal of the first GOA unit of the (n+1)-th stage GOA module is configured to pull down the input terminals and the output terminals of the plurality of second GOA units of the n-th stage GOA module through the pull-down unit of the n-th stage GOA module.

11. The display panel according to claim 10, wherein the first GOA unit further comprises a first clock signal terminal, and the first GOA units of the multi-stage cascaded GOA modules sequentially output signals according to a first clock signal input from the first clock signal terminal.

12. The display panel according to claim 11, wherein the first GOA unit of the n-th stage GOA module comprises an eleven transistor, a twenty-second transistor, a thirty-first transistor, and a forty-first transistor, and wherein both a gate and a source of the eleven transistor are connected to the input terminal of the first GOA unit of the n-th stage GOA module, and a drain of the eleven transistor is connected to a first pull-up node;

a gate of the twenty-second transistor is connected to the first pull-up node, a source of the twenty-second transistor is connected to the first clock signal terminal, and a drain of the twenty-second transistor is connected to the output terminal of the first GOA unit of the n-th stage GOA module;

a gate of the thirty-first transistor and a gate of the forty-first transistor are connected to the pull-down terminal of the first GOA unit of the n-th stage GOA module, a source of the thirty-first transistor and a source of the forty-first transistor are connected to a constant voltage low potential, a drain of the thirty-first transistor is connected to the output terminal of the first GOA unit of the n-th stage GOA module, and a drain of the forty-first transistor is connected to the first pull-up node.

13. The display panel according to claim 12, wherein the pull-up unit of the n-th stage GOA module comprises an eleventh transistor, a gate and a drain of the eleventh transistor is connected to the input terminal of the first GOA unit of the n-th stage GOA module, and a drain of the eleventh transistor is connected to pull-up terminals of the plurality of second GOA units of the n-th stage GOA module.

14. The display panel according to claim 11, wherein eight clock cycle signals are used at the first clock signal terminal, with any two successive clock cycle signals separated by half a clock cycle.

15. The display panel according to claim 10, wherein the second GOA unit further comprises a second clock signal terminal, and the plurality of second GOA units of each stage GOA module sequentially output a plurality of scan drive signals according to a second clock signal input from the second clock signal terminal.

16. The display panel according to claim 15, wherein any second GOA unit of the second GOA units of the n-th stage GOA module comprises a twenty-second transistor, a thirty-second transistor, a forty-second transistor, and an inverter, and wherein a gate of the twenty-second transistor is connected to a pull-up terminal of the second GOA unit of the n-th stage GOA module, a drain of the forty-second transistor, and an input terminal of the inverter, a source of the twenty-second transistor is connected to the second clock signal terminal, and a drain of the twenty-second transistor is connected to the output terminal of the any second GOA unit of the n-th stage GOA module; and a gate of the thirty-second transistor and a gate of the forty-second transistor are connected to an output terminal of the inverter, a source of the thirty-second transistor and a source of the forty-second transistor are connected to a constant voltage low potential, a drain of the thirty-second transistor is connected to the output terminal of the any second GOA unit of the n-th GOA module, and a drain of the forty-second transistor is connected to the pull-up terminal of the second GOA unit of the n-th GOA module.

17. The display panel according to claim 16, wherein the inverter comprises a fifty-first transistor, a fifty-second transistor, a fifty-third transistor, and a fifty-fourth transistor, and wherein a gate and a source of the fifty-first transistor are connected to a constant voltage high potential terminal, and a drain of the fifty-first transistor, a drain of the fifty-second transistor, and a gate of the fifty-third transistor are connected;

a gate of the fifty-second transistor and a gate of the fifty-fourth transistor are connected to the pull-up terminal of the second GOA unit, and a source of the fifty-second transistor and a source of the fifty-fourth transistor are connected to the constant voltage low potential; and a source of the fifty-third transistor is connected to a low frequency control signal, and a drain of the fifty-third transistor and a drain of the fifty-fourth transistor are connected with each other and connected to the output terminal of the inverter.

18. The display panel according to claim 10, wherein the pull-down unit of the n-th GOA module comprises a forty-first transistor, a gate of the forty-first transistor is connected to the pull-down terminal of the first GOA unit of the n-th GOA module, a source of the forty-first transistor is connected to a constant voltage low potential, and a drain of the forty-first transistor is connected to pull-up terminals of the plurality of second GOA units of the n-th GOA module.

* * * * *